Nov. 6, 1928.

H. PIERCE 1,690,431

POWER OPERATED IRONING AND PRESSING MACHINE

Filed April 5, 1922      8 Sheets-Sheet 1

Fig. 1.

Inventor
Harry Pierce
By his Attorney
Louis Prevost Whitaker

Nov. 6, 1928.

H. PIERCE 1,690,431

POWER OPERATED IRONING AND PRESSING MACHINE

Filed April 5, 1922

Inventor
Harry Pierce
By his Attorney
Louis Prevost Whitaker

Nov. 6, 1928.

H. PIERCE 1,690,431

POWER OPERATED IRONING AND PRESSING MACHINE

Filed April 5, 1922   8 Sheets-Sheet 7

Inventor
Harry Pierce
By his Attorney
Louis Prevost Whitaker

Nov. 6, 1928.

H. PIERCE 1,690,431

POWER OPERATED IRONING AND PRESSING MACHINE

Filed April 5, 1922     8 Sheets-Sheet 8

Inventor
Harry Pierce
By his Attorney
Louis Prevost Whitaker

Patented Nov. 6, 1928.

1,690,431

UNITED STATES PATENT OFFICE.

HARRY PIERCE, OF BROOKLYN, NEW YORK, ASSIGNOR, BY MESNE ASSIGNMENTS, TO THE AMERICAN LAUNDRY MACHINERY COMPANY, OF CINCINNATI, OHIO, A CORPORATION OF OHIO.

POWER-OPERATED IRONING AND PRESSING MACHINE.

Application filed April 5, 1922. Serial No. 549,814.

My invention consists in the novel features hereinafter described, reference being had to the accompanying drawings which illustrate one embodiment of my invention selected by me for purposes of illustration and the said invention is fully disclosed in the following description and claims.

The object of my invention is to provide a press for ironing and pressing garments and other articles, having a stationary work support and a movable press head which is given its entire movement into pressing or closed position, and returned to open position, by means of a driving shaft operated by power and preferably by an electric motor, means being provided for arresting and locking the power actuated operating devices when the movable pressing member is in closed and in open position, and means being also provided under the control of the operator for releasing the locking mechanism and bringing the motor actuated operating devices into operation. My invention also contemplates a guard movable independently of the movable pressing member into and out of operative position, and so constructed and arranged that the power actuated operating mechanism cannot be brought into operation to close the press until the guard has been brought fully into its operative position in which it substantially surrounds the stationary work support and precludes the possibility of injury to the operator. My invention also includes other features of construction and combination of parts which are hereinafter fully described and illustrated in the accompanying drawings.

In the said drawings.

The main frame of the machine comprises a base, 1, having an open standard, 2, substantially square in cross section, projecting upwardly therefrom with a rearwardly and upwardly extending arm, 3, extending above and to the rear of the standard, 2, and provided with means for supporting the pivotally mounted press head. Mounted upon the upper end of the standard, 2, is the support, 4, for the stationary work support or lower buck, indicated at 5, the latter being of any desired shape or form, according to the character of work which the press is to be called upon to perform. The lower buck is preferably hollow and is provided interiorly with a heating chamber, indicated at 6, which may be supplied with steam, or the buck may be heated by other means, or may not be provided with heating means as preferred. The work support or buck is provided with the usual padding, indicated at 7, usually comprising a plurality of thicknesses of compressible fabric covered by a cloth, the particular details of which are not material to the present invention. The main frame is also conveniently provided with a table or platform, indicated at 8, and secured to the main frame in any desired manner, for supporting portions of the garment or work being operated upon which are not supported by the buck. The movable pressing member comprises a press head, indicated at 9, which is preferably pivotally mounted, and in this instance is carried by the forward end of a pivoted frame or casting comprising a pair of arms, 10, which are pivotally mounted, between their ends upon a hollow shaft, 11, or pivot, carried in the upper end of the rearwardly and upwardly extending arm, 3, of the main frame, said arms being connected by transverse members to form a rigid pivoted frame. The pivoted frame which carries the press head, 9, is preferably provided with a downwardly extending actuating arm, indicated at 12, and in order to provide for the adjustment of the head with respect to the buck or work support, the arm 12 is pivotally connected to the rearwardly extending portions of the arms 10, at 13, and extends upwardly and forwardly therefrom, and is adjustably connected with the frame preferably by means of a bolt, 14, threaded into the cross bar 10ª and extending through a sleeve 15 at the upper end of the arm 12, the said bolt being provided with a nut or collar, 16, at one end of said sleeve and with a winged head, 17, at the other end of said sleeve, so that the bolt may be rotated when desired to vary the adjustment of the press head with respect to the actuating arm, 12.

The press head is provided with a smooth lower pressing face, which is heated in any desired manner. Preferably the head is provided with an internal steam chamber above the pressing face through which steam is circulated by means of suitable pipe connections, 18, extending to the hollow pivoted shaft, 11, and connecting with supply and return pipes 19 and 20, so that the supply of steam is not affected by the oscillations of the head at the pivoted shaft 11 into and out of operative position. In presses of this kind, it is desirable to have the press head when in open position at a considerable distance from the work support or lower buck so as to facilitate the placing and arranging of the garment or article to be ironed upon the work support, and this necessitates a movement of the upper pressing member or head through a considerable arc to and from its closed or pressing position. The opening and closing movements of presses of this kind have usually been accomplished by means of levers actuated by the operator's foot, but in my press such foot levers are dispensed with and the entire movement of the press head into pressing position is accomplished by the power actuated operating mechanism hereinafter described. In the embodiment of my invention herein shown, 21, represents a crank shaft mounted in bearings in the standard, 2, of the main frame, and provided with crank arms, 22, carrying a crank pin 23. The crank shaft, crank arms and crank pin may be formed of separate parts keyed or otherwise secured for joint rotation, as shown herein, or said parts may be formed as one integral casting or forging, if desired. Surrounding the crank pin 23, is a cross head, 24, in which is slidingly mounted a block, 25, having a bearing aperture engaging the crank pin, and capable of moving longitudinally in the cross head. On each side of the block, 25, between it and the end of the cross head, is a cushioning spring, said spring being indicated at 26, and being retained in position in any desired way, as by engaging lugs, 27, on the opposite faces of the block, 25, and at the opposite ends of the cross head. This cross head is connected to the lower end of the actuating arm, 12, for the movable pressing member, in this instance by means of a rod, 28, which is screwed or otherwise secured to the cross head, and is provided at its outer end with a block or casting, 29, pivotally connected at 30 in the lower end of the arm, 12. The cross head and the rod, 28, and block, 29, form a connecting rod between the crank pin, 23, and the actuating arm, 12, and the springs, 26, are so arranged as to cushion the starting and stopping movements of the press head, as will be readily understood. The crank shaft, 21, is provided with suitable means for importing intermittent motion thereto under the control of the operator for effecting the closing and opening movements of the press, and in the arrangement shown in the drawings, each of such movements is accomplished by a half revolution of the crank shaft. In this instance the crank shaft is shown provided with a driving gear, 31, of considerable diameter, which meshes with a driving pinion, 32, on a driving shaft, 33, to which the power is applied. I prefer to provide an electric motor, 34, for operating the driving shaft and the pinion, 32, is formed in or secured to the motor shaft, or arranged to be driven thereby in any desired manner. I prefer to employ a very small driving pinion, thus securing a large gear reduction between the motor shaft and the crank shaft, and as the greater part of the movements of the upper press head in both directions require only sufficient power to move the head and the connected parts, the construction herein shown is admirably adapted for use with an electric motor of small power and correspondingly small current consumption and enables the motor to quickly acquire its normal operating speed. The motor, 34, may be conveniently supported on a bracket, 35, secured to the main frame, and provided with an auxiliary bearing, indicated at 36, for the motor shaft, which in this instance, has the pinion, 32, formed or cut as an integral part of the shaft on account of its small diameter. Although this is not essential, it enables me to obtain the desired gear reduction without making the gear wheel, 31, unduly large.

Figure 1:
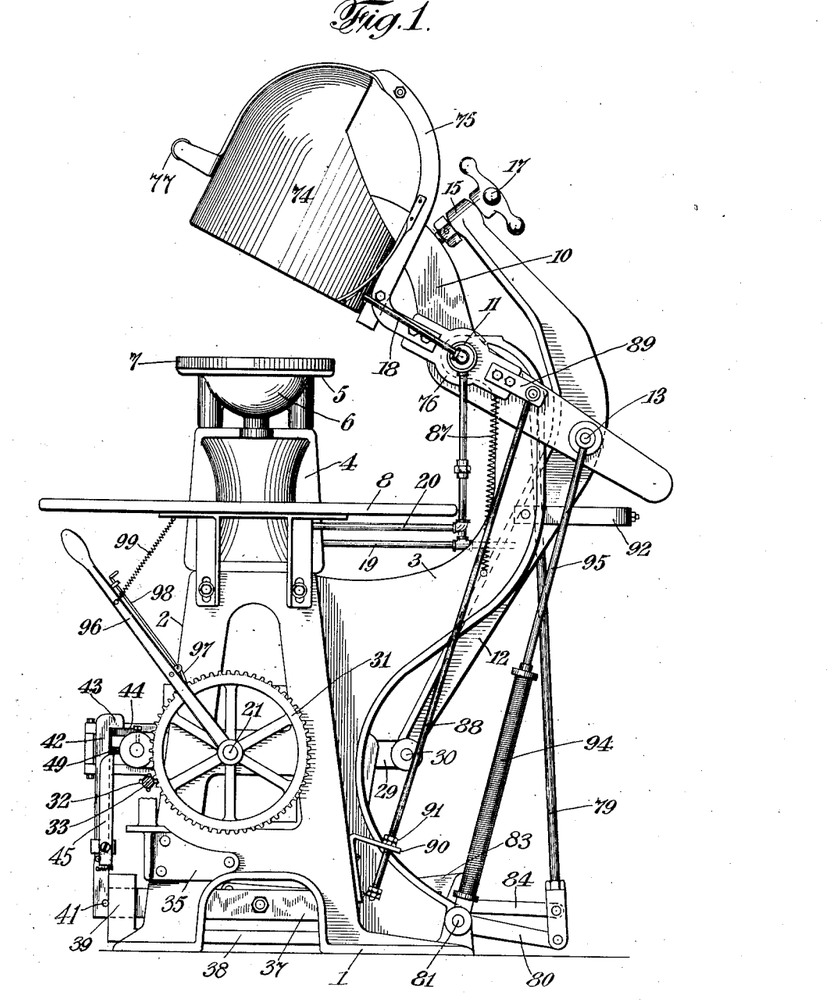
Fig. 1 represents a right side elevation of a power operated ironing and pressing machine embodying my invention.
Figure 6:
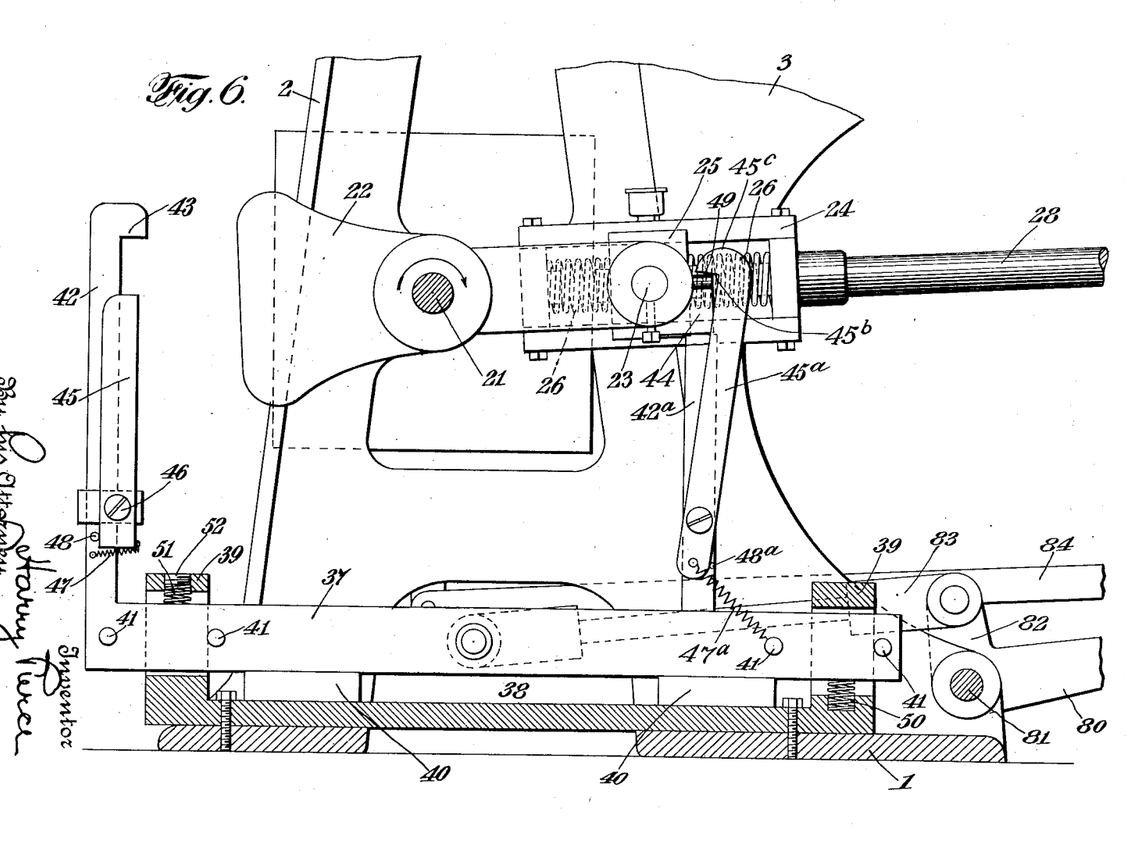
Fig. 6 is a vertical section on the line 6—6 of Fig. 4.
Figure 9:
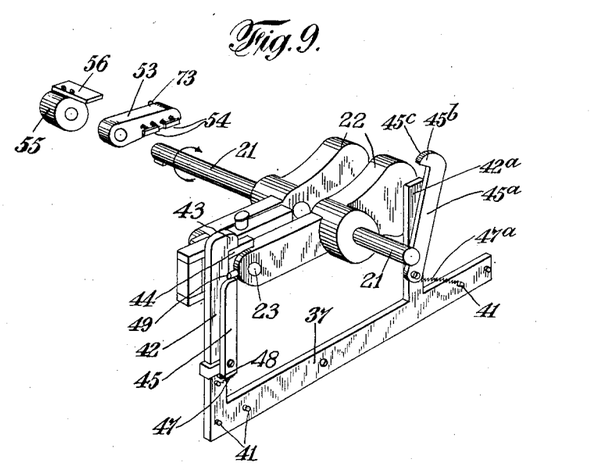
Fig. 9 is a detail perspective view illustrating the locking mechanism for the power actuated operating mechanism, and also illustrating means for actuating the movable arm of the controlling switch.

As the crank shaft is operated always in the same direction, indicated by the arrows in the various figures, I provide means for arresting the crank shaft at two separate points in its cycle, preferably separated 180°, and in association with the arresting means I prefer to provide means for positively locking the crank shaft and the parts connected therewith against movement, so as to insure the proper operation of the press at all times. The arresting mechanism is preferably of such form as to bring the parts gently to rest with a cushioning effect to absorb any shock, leaving the operating mechanism and pressing members in reasonably definite position both in open and closed full pressure positions of the press, the arresting movement being terminated positively with the parts in a limited position beyond which they cannot go. Such arrest is desirable to prevent the operating mechanism from in any manner over-running and thereby moving the pressing members to a position of less pressure or efficiency, after they have been moved to the position in which the best pressing effects are obtained. The actuating mechanism for pressing members also includes the crank arms 22 and connecting rod 28 which in effect operate as toggle members which tend to maintain themselves in position when the toggles are straightened but which, when the toggle knuckle, to wit, crank pin 23 is moved to one side or the other, tend to open up, as a result of which it is desirable to stop the operating mechanism with the toggles as nearly in full operative position as possible. The arresting and locking mechanism which I prefer to employ is best illustrated in Figs. 6 and 9 and comprises the following elements. 37 represents a horizontal sliding locking bar mounted in a guiding frame secured to the base of the machine and comprising a bottom plate, 38, and vertically disposed guides, 39, at the front and rear end of the plate, having vertical slots formed therein in which the locking bar is inserted. Tht locking bar itself rests preferably upon fibre blocks, 40, secured upon the upper face of the plate, 38, and is limited in its longitudinal movement by transversely disposed pins or studs, 41, in front and rear of the guides, 39. The front end of the locking bar, 37, is provided with a vertical arm, 42, the upper end of which is provided with an arresting shoulder, 43, adapted to engage a portion of the crank as indicated, for example, in Fig. 1, the crank being provided with a cushion or buffer, 44, preferably composed of a composition of fibre or other suitable material for cushioning the contact between the crank and arresting shoulder. The arm, 42, is also provided with a pivoted locking lever, 45, pivoted at 46, and held in normal position by a spring, 47, against a stop, 48, this locking lever being in position to be engaged by a locking stud, indicated at 49, carried by the crank, and so arranged that as the crank approaches the arresting shoulder, 43, the locking pin, 49, will move the pivoted locking lever, 45, forwardly until it passes off of the upper end thereof, when the locking lever, 45, will drop back beneath the pin, as indicated in Figs. 1 and 9, for example, so that the crank will remain locked against movement until the locking bar, 37, is shifted, as hereinafter described.

The locking bar, 37, is also provided, adjacent to its rear end, with a vertical arresting arm, 42$^a$, the upper end of which will engage the buffer, 44, on the crank, for the purpose of arresting the crank in its opposite position from that in which it is arrested by the arm, 42, and the arresting arm 42$^a$ is also provided with a pivoted locking arm, 45$^a$, which in this case is provided with a hook portion or shoulder, 45$^b$, and a curved or inclined face, 45$^c$, as best shown in Fig. 9, said locking bar being held in its normal position by a spring, 47$^a$, against a stop, 48$^a$. It will readily be understood, by reference to Fig. 9, for example, that the locking bar, 37, may be moved longitudinally so as to release the crank in either position in which it may be locked, and when the rotation of the crank toward the rear is effected, the crank will be stopped by the arresting arm, 42$^a$, and the locking pin, 49, will push the locking lever, 45$^a$, rearwardly until it passes beneath the same and is locked thereto, as indicated in Fig. 6. As the shock in arresting the crank in its rear position, as indicated in Fig. 6, is exerted in a downward direction, I preferably provide a shock absorbing spring 50 beneath the locking bar, and said spring is conveniently inserted in a recess in the bottom of the guide, 39. The locking bar is also provided with a similar shock absorbing spring, 51, at its forward end, which however, is located above the bar, as the shock imparted to it when the crank engages the shoulder, 43, is exerted in an upward direction, the said spring, 51, being conveniently located in an aperture in the upper part of the forward guide, 39, which aperture is closed by screw plug, 52. The shock absorbing springs 50, 51 have sufficient tension to produce the necessary retarding effect to bring the parts gently to rest and absorb any shock, and when said springs are compressed so far as permitted by their mounting structure the moving locking bar 37 is positively brought to rest by positive limits reached by said bar at the ends of the guides 39. Beyond this point the moving parts are not permitted to go until again released for the next operating movement.

In connection with the foregoing mechanism, I also provide devices actuated by the operator for shifting the locking bar so as to disengage one set of locking mechanism last engaged by the crank, therefrom, and for applying power to the driving shaft and crank shaft simultaneously, in this instance by starting the electric motor, and at the same time, I provide means for shutting off the power applied to the driving shaft simultaneously with the arresting and locking of the crank, the result being that the press head will be swung down into pressing contact with the lower buck or work support and locked in position, or on the other hand, will be swung upward to its full position and locked therein under the control of the operator.

Figure 7:
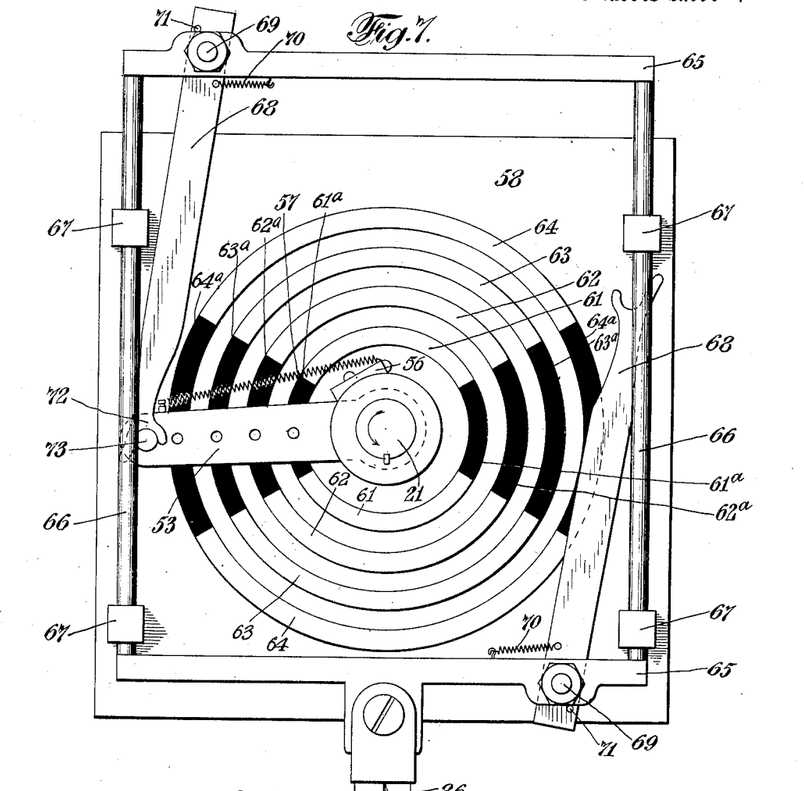
Fig. 7 is an elevation of the controlling switch for the electric motor and the actuating means therefor.
Figure 8:
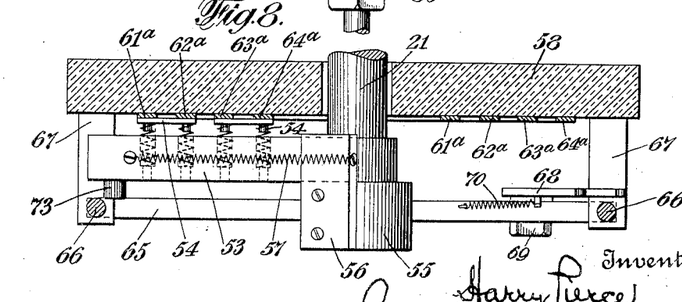
Fig. 8 is a horizontal section of the switch mechanism.

In the embodiment of the invention shown herein, in which an electric motor is employed as the source of power, I employ in connection with the crank shaft or other rotating part driven by the motor, a switch mechanism, shown in detail in Figs. 7 and 8 and 9, which I conveniently employ on effecting the starting and stopping of the motor. As herein shown, 53, represents a rotary switch arm which is loosely mounted in this instance on the crank shaft, 21, and is provided with a pair of brushes, 54, yieldingly supported in connection therewith in any usual or desired manner, and in this instance being contact plates adapted to bridge over and connect two adjacent circular or segmental contacts. The crank shaft, 20, is provided with a collar, 55, carrying a driving plate, 56, which engages the contact arm, 53, for the purpose of driving it forwardly in the direction of rotation of the crank shaft, and a light spring, 57, connects the switch arm, 53, with the crank shaft so as to hold the arm, 53, normally in engagement with the driving plate, 56. This construction insures the rotation of the switch arm with the crank shaft when the latter is operated by motor, but permits the switch arm to be advanced independently of the crank shaft, as will be readily understood. Adjacent to the crank shaft, I provide a switch plate, 58, suitably supported on the main frame provided with a plurality of concentric circular contact strips 61, 62, 63 and 64, arranged concentrically with the axis of the crank shaft. These contact strips are preferably made circular for the purpose of affording a continuity of bearing surface to the brushes, but each of said circular contact strips is provided with two oppositely disposed insulated portions, 61$^a$, 62$^a$, 63$^a$, and 64$^a$. This divides the switch board into four segments, the upper and lower segments which I term the live segments, being connected with the electrical circuit through the motor, and the source of electricity, while the intermediate smaller segments, which I term the dead segments, are insulated from the circuit. The driving plate, 56, is so located on the crank shaft that when the crank is stopped in one of its locked positions, the switch arm, 53, will be always upon one of the dead segments of the switch and no current will be supplied to the motor. Obviously, in order to start the motor, the switch arm, 53, must be moved from one of the dead segments to a live segment of the switch, when the motor will immediately start the rotation of the crank shaft and the crank will, through the driving plate, 56, overtake the switch arm and carry it with the crank until it passes off of the live segment onto the opposite dead segment, thereby cutting off current to the motor and facilitating the arresting and stopping of the crank and its connected mechanism.

For the purpose of advancing the switch arm so as to start the motor, I conveniently employ a rectangular reciprocating frame which I term the switch arm advancing frame, and which is clearly shown in Fig. 7. This frame comprises top and bottom bars, 65, connected by vertical bars, 66, having a sliding engagement with guides, 67, in this instance mounted on the switch board, 58. The advancing frame is provided with two vertically disposed pivoted levers, 68, each pivoted to one of the horizontal bars of the frame by bolt or stud, 69, and held in operative yielding position by a spring, 70, a stop, 71, being provided on each of said levers for limiting its movement under the action of the spring, 70. Each of these levers is provided with a forked portion, 72, for engaging a stud, 73, on the outer end of the switch arm, 53, in whichever position the switch arm, 53, is left after the locking of the crank shaft the stud, 73, on the switch arm will be in position to be engaged by the forked end, 72, of one of the levers, 68, on the advancing frame and the vertical movement of the frame will advance the switch arm, 53, so as carry it off of the dead segment on which it rests and onto the next adjacent live segment, thereby starting the motor, the operation of which will continue until the switch arm has been carried by the half revolution of the crank shaft off of the live segment and onto the next adjacent dead segment of the switch.

Figure 3:
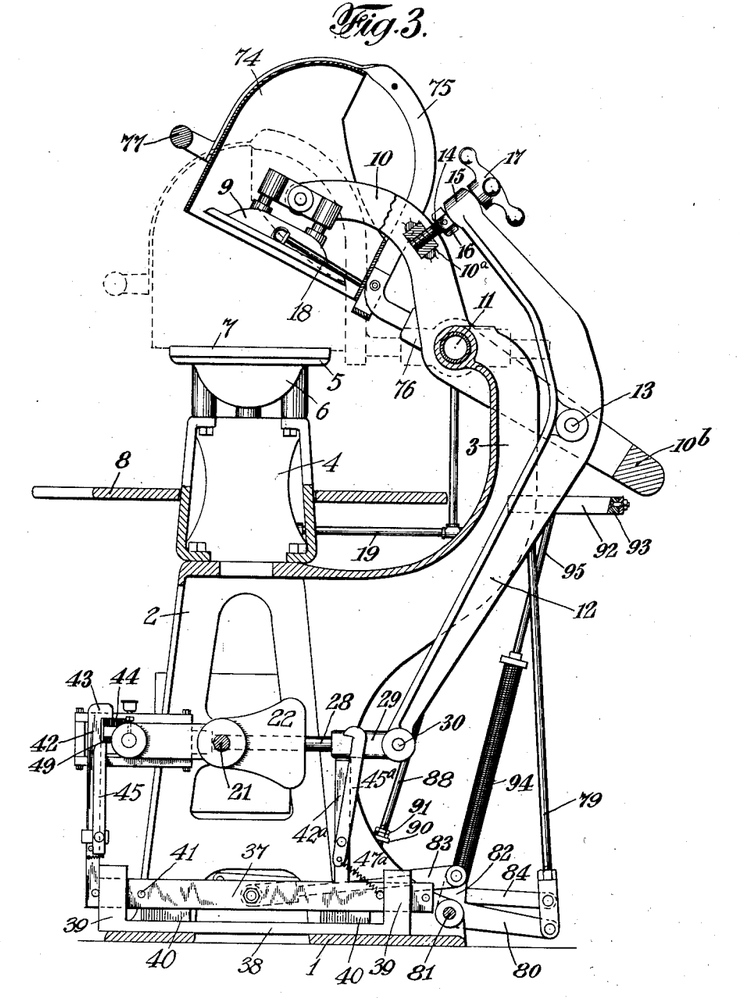
Fig. 3 is a central vertical longitudinal section through the machine.
Figure 4:
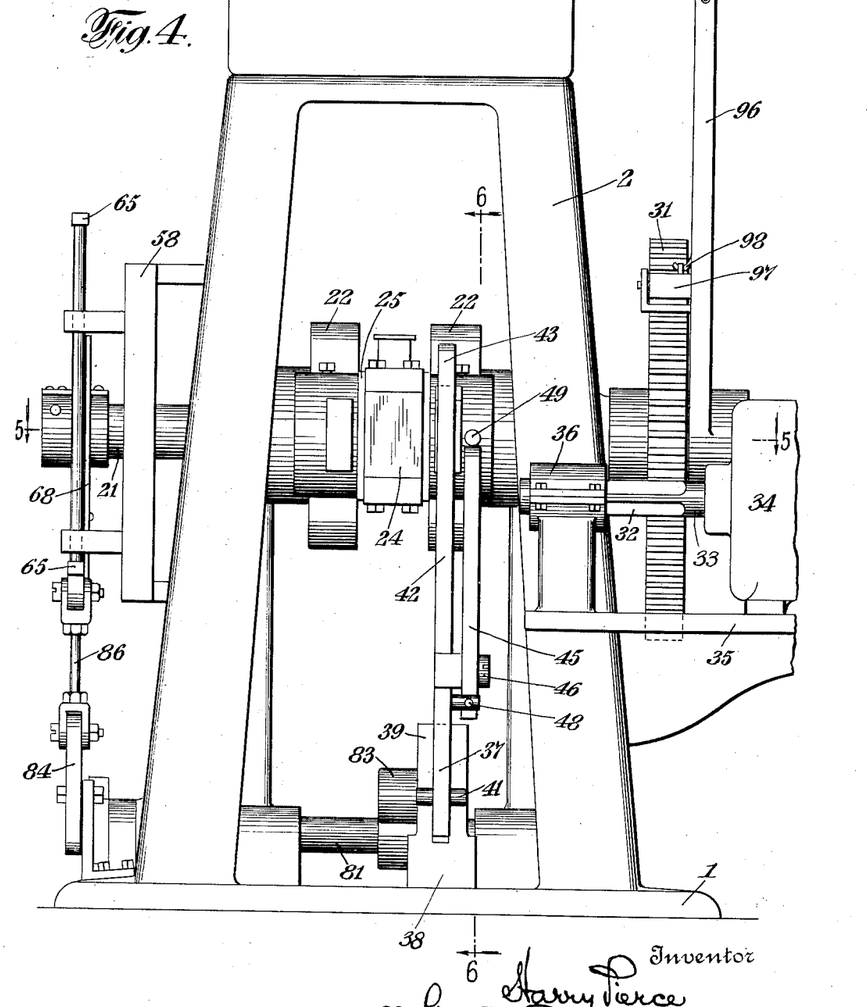
Fig. 4 is an enlarged front elevation of the lower portion of the machine.
Figure 5:
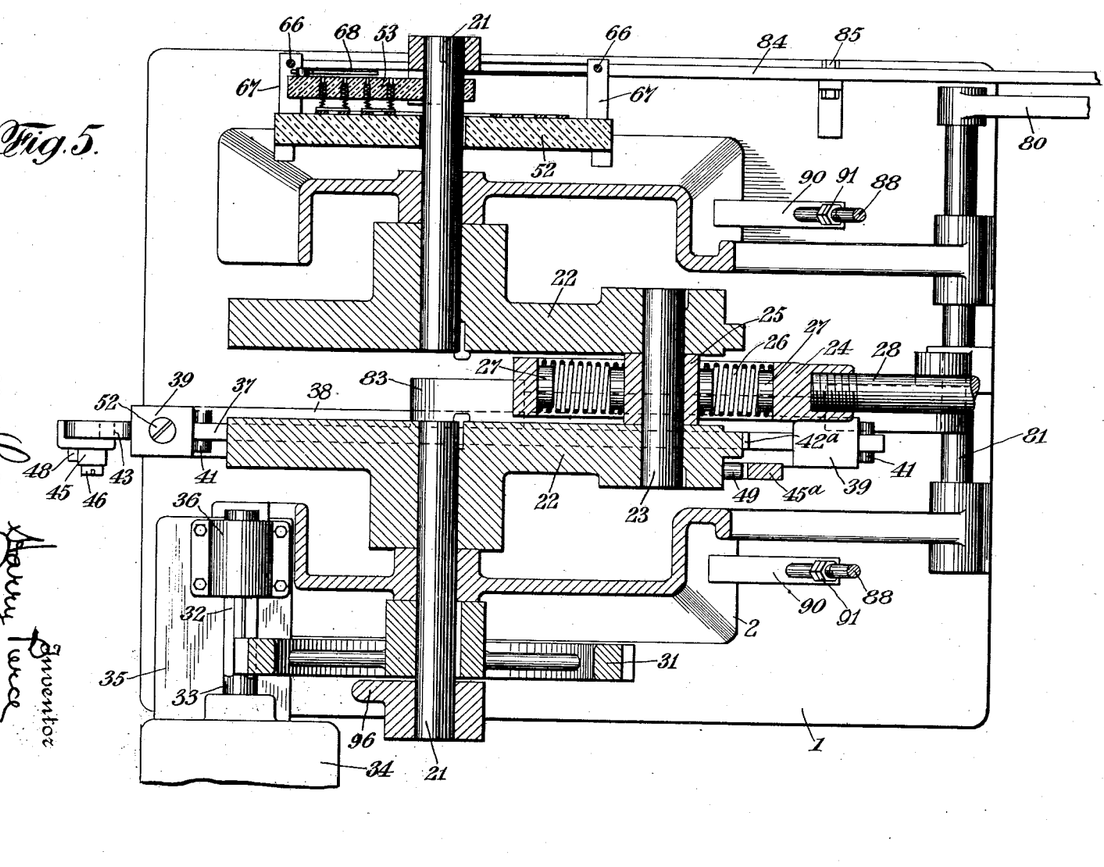
Fig. 5 is a horizontal section of Fig. 4, on the line 5—5 thereof.

As the upper pressing member or press head has considerable weight and is swung quickly down upon the lower pressing member or buck into final pressing position, injury to the hands of the operator might result if they were not entirely removed from the buck or work support before the descent of the press head. I prefer, therefore, to employ in conjunction with my press, a guard movable independently of the press head, and so connected with the means for releasing the locking mechanism for the crank and starting the operation of the power actuating operating means, that power cannot be applied to move the head toward pressing position until the guard, which preferably entirely surrounds the buck or work support when in operative position, has been lowered to such position as to preclude the possibility of the operator's hands being caught between the pressing members. In the machine herein shown, I have illustrated such a guard, constructed and arranged so that the guard itself is lowered into operative position and simultaneously unlocks the crank and advances the switch arm so as to start the motor, but I do not limit myself to this construction as it is only necessary that the said parts shall be simultaneously actuated and they may be operated either by manually operating the guard or by actuating it through other means. As herein shown, the press is provided with a guard, 74, preferably formed of sheet metal, wire gauze, or other light material, and supported by a guard frame, 75, which is pivotally mounted by means of bearings, 76, upon the shaft, 11, on which the upper press head is pivoted. In this instance the guard, 74, is provided with a handle, 77, by means of which the guard can be raised and lowered independently of the press head, as indicated in Fig. 3, and means are provided for positively connecting the guard with the switch advancing frame and with the locking bar for the purpose of simultaneously releasing the power actuated operating mechanism and applying power thereto. To this end the casting which forms the bearing, 76, and to which the guard is connected, is provided with a rearwardly extending arm, 78, connected by a pivoted link, 79, to an arm, 80, on a rock shaft, 81, mounted in bearings on the main frame and provided with a short vertically disposed arm, 82, which is connected by a link, 83, with the horizontal locking bar, 37. The vertical link, 79, is also connected to one end of an oscillating lever 84 pivoted centrally, at 85, to a support connected with the main frame, the other end of the lever, 84, being connected by link, 86, with the cross bar, 65, of the advancing frame for the switch arm.

Figure 2:
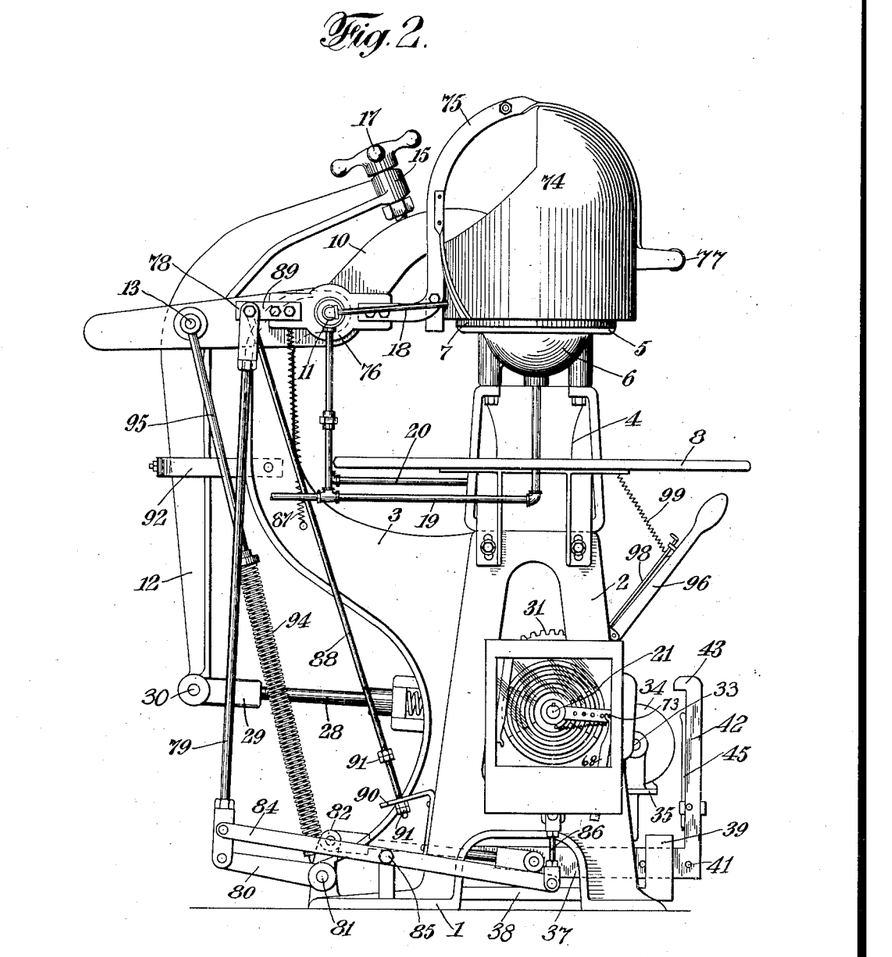
Fig. 2 is a left side elevation of the same.

It will thus be seen, especially by reference to Fig. 2, that when the guard, 74, is brought down into operative position so as to substantially enclose the pressing members and to prevent the possibility of accident, the locking bar will be moved to its most forward position, thereby releasing the crank from the arresting and locking devices carried at the forward end of the locking bar, and bringing those at the rear end of the bar into operative position, and simultaneously the advancing frame for the switch arm will be drawn down into its lowest position, causing the switch arm to be advanced to the lower live segment of the switch and setting in motion the motor and the crankshaft, and thereby swinging the press head downward into pressing position, where it is locked by the arresting and locking devices at the rear end of the locking bar, 37. The parts I have shown in Fig. 2 as they appear at the conclusion of this movement, the switch arm having been carried by the crank shaft onto the right hand or forward dead segment of the switch. It will also be seen that when the guard, 74, is raised, the locking bar will be shifted to the rear and the advancing frame will be raised, thereby advancing the switch arm to the upper live segment, starting the motor and swinging the press head to raised position, where it will be held by the arresting and locking mechanism at the forward end of the locking bar. It is perfectly obvious, therefore, that as the guard 74, the locking bar, 37, and the controlling mechanism for the motor are coupled together for joint and simultaneous movement, the operator's hand (or foot) could be applied at any convenient point on any part of the connected mechanism to effect the joint and simultaneous movement of the several parts. I find it convenient to set these parts in motion by means of a handle applied to the guard, and operated by the hand of the operator, but I wish it to be understood that these connected parts can be simultaneously actuated by the operator in any desired manner.

I prefer to provide the guard, 74, with counter balance mechanism, comprising in this instance, counter balance springs, 87, and I also provide means for limiting the movement of the guard adjustably, consisting in this instance of a stop rod, 88, connected to the arm 78, and a similar arm, 89, secured to the other bearing casting of the guard, and extending downwardly through guiding apertures in brackets, 90, secured to the main frame (see Figs. 1 and 2), the rods, 88, being provided with threaded portions, carrying stop nuts, 91, or stop collars for engaging the brackets, 90, and limiting the downward and also the upward movements of the guard.

When the guard is in raised position, as shown in Figs. 1 and 3, the switch mechanism will be in the position indicated in Fig. 7, that is, the advancing arm is in raised position and the upper advancing arm, 68, is in engagement with the stud, 73, the switch arm being located substantially centrally of the left hand and rearmost dead segment of the switch. At this time the crank is locked, as shown in Fig. 3, by the arresting and locking devices at the forward end of the locking bar, 37. It will be seen, therefore, that as the guard is lowered into its operative position, indicated in dotted lines in Fig. 3, the switch arm, 53, will be moved a considerable distance toward the lower live segment of the switch before its brushes will make contact with the contacts thereof, and the connections between the guard and the locking lever and the switch advancing frame are so adjusted, as before stated, that the switch arm, 53, will not be moved into operative relation with the live segment, nor will the crank be released from the locking mechanism, until the guard, 74, has been fully brought into its operative position. Should the end portion of the operator's hand rest upon the work support and buck, the guard will be arrested in its descent before the switch arm, 53, has been moved far enough to start the motor, so that the press cannot be operated into pressing position unless and until the guard, 74, has been lowered to such a position as to preclude the possibility of injury to the operator.

It will be noted that as the pressing head swings down into contact with the padded work support, the greater portion of its movement encounters practically no resistance so that the motor may quickly attain its effective operating speed. Moreover, the press head possesses considerable weight, and therefore descends into pressing position with considerable force, due to its inertia of movement. The press head, therefore, comes very firmly into contact with the padded work support, and exerts a very considerable pressure on the garment or other article to be pressed, determined by the adjustment of the press by means of the adjusting shaft, 14. I prefer to provide what I term an emergency stop for arresting the downward movement of the press head in case it is so adjusted as not to make contact with the garment on the padded work support. In this instance I have shown a metal strap, 92, secured to the rearwardly and upwardly extending arm, 3, of the press frame, and provided with an elastic yielding cushioning stop, 93, to engage the downwardly extending arm, 12, for the press head. Should the adjustment of the press head be such that the press head cannot be forced downward far enough to permit the locking of the crank shaft and the movement of the switch arm by the crank shaft to the proper dead segment of the switch for stopping the motor, the motor circuit will be provided with the usual fuse (not shown) which will be blown out and prevent injury to the motor. These fuses can be replaced in a few moments, in case the press is stopped in this manner. It is not necessary to counter balance the press head, but I have shown in this instance comparatively light counter balance springs, indicated at 94, connected by links and rods, 95, with the rear ends of the arms, 10, carrying the press head. These springs are so arranged as to be practically slack when the head is in raised position, and only slightly expanded (see Fig. 2) when the press head is in pressing position. These springs when used, therefore, only slightly check the closing movement of the press head, while their force is utilized during the first part of the opening movement of the press, when the motor is beginning to rotate, the crank shaft, the springs becoming practically slack before the head reaches its uppermost position, so that the springs do not have to be overcome in arresting or checking the upward movement of the press head.

While the movement of the press head is positively arrested at the close of its downward and upward movements, this is accomplished without any material shock to the apparatus. On the downward stroke of the press head, the impact of the head itself is cushioned by the padded work support, and the garment or other article operated on, and also by means of the cushioning springs, 26, in the cross head, 24, and also by the spring, 50, and fibre block, 40, beneath the locking bar, 37. On the upward movement of the press head, it is arrested by the arresting and stopping mechanism at the forward end of the locking bar, the press head being relieved of the lifting force of the counter balance springs, 94, before reaching its final position, as before described, and the force of its arrest is cushioned by the springs, 26, of the cross head, 24, and also by the spring, 51, above the forward end of the locking bar. It follows, therefore, that the operation of the press head in both directions is rapid, effective and ceases instantaneously as the press head arrives at its pressing or open position, in which it is locked without noticeable shock and jar. These cushioning devices also cooperate with the padded work support in accommodating slight variations in the thickness of the garments or other articles operated upon. Greater variations in thickness in such garments or other articles can be readily accommodated by the adjustment provided between the press head and actuating arm, 12, by turning the screw bolt, 14.

For convenience in rotating the crank shaft, in case it should become desirable for any reason to do so, I prefer to provide the crank shaft with a pivoted hand lever, 96, provided with a pawl, 97, adapted to be moved into and out of operative relation with the teeth of the gear wheel, 31, by means of a rod, 98, and normally held out of operative position. The arm, 96, is conveniently supported yieldingly at a convenient point beneath the table, 8, by means of spring, 99, which holds it out of the way, but permits it to be used when desired or necessary.

The operation of my improved press is as follows:—The normal position of the press when in open position is as shown in Figs. 1 and 3, the head being raised and the crank locked by the arresting and locking mechanism carried by the forward end of the locking bar, 37. The operator will spread the garment or other article to be ironed or pressed upon the buck, and smooth out any wrinkles therein. The operator will then actuate the guard, 74, and its connected mechanism, in this instance by placing the hand on the handle or bar, 77, and drawing down the guard into the position illustrated in dotted lines in Fig. 3. The downward movement of the guard is communicated by means of the link, 79, and arm, 80, to the rock shaft, 81, and actuating arm, 82, connected with the sliding locking bar, 37, by the link, 83, and movement is also imparted by the link, 79, to the rocking lever, 84, so as to actuate the shifting frame in a downward direction. The switch being in the position illustrated in Fig. 7, the downward movement of the advancing frame causes the left hand forked arm, 68, which is in engagement with the stud, 73, on the switch arm, to advance the switch arm off of the dead segment of the switch at the rear portion thereof, and the switch arm contacts, 54, will make contact with the contacts of the lower live segment of the switch only when the guard has reached its final position, indicated in dotted lines in Fig. 3. If any portion of the operator's hand is resting on the buck, the guard will be prevented from reaching its lowest position, and no action of the press can take place until the operator's hand is removed and the guard lowered to such position that no injury to the operator can result. The shifting of the locking bar, 37, forwardly, releases the crank from its locking engagement with the arresting shoulder, 43, and pivotal locking piece, 45, at the forward end of the locking bar, leaving it free to be started by the motor as soon as the switch arm has reached the live segment of the switch. As soon as the switch arm closes the motor circuit or circuits, the motor instantly starts actuating the crank shaft in the direction of the arrows in the several figures, and drawing down the head. The weight of the head assists the motor, and as there is no resistance to the downward movement of the head, the motor is thus enabled to attain its most effective operating speed and the head is quickly swung through the full arc from its open to its closed position, thus bringing the head with considerable force and supplemented by the inertia of the mass of the head, into contact with the garment on the padded work support. The forward shifting of the locking bar, 37, has brought the arresting arm, 42$^a$, and locking device 45$^a$, on the rear portion of the locking bar, into operative position to engage the crank at the conclusion of its movement, through 180° or half turn, as clearly illustrated in Fig. 6, and the crank and the head connected therewith is firmly locked with the head in closed pressing position. The power actuated mechanism will have been shut off just before, or just as the crank reaches its final locking, by reason of the fact that the rotation of the crank shaft will cause the driving plate, 56, to overtake the switch arm and carry it away from the forked advancing arm, 68, across the live segment at the lower part of the switch, and onto the dead segment at the forward part of the switch, leaving it in the position indicated in Fig. 2. The stud, 73, on the switch arm will engage the forward advancing arm, 68, pushing it to one side and seating itself in the forked portion thereof, as indicated in Fig. 2. As before stated, the shock of arresting the head and crank is thoroughly cushioned by the padding on the buck, by the springs, 26, in the cross head, 24, by the cushioning spring, 50, beneath the locking bar, and by the counter balance springs, 94, if the same are employed. As before stated, the counter balance springs are preferably slack at the beginning of the downward movement of the head, and these springs will exert a gradual increasing counter balancing effect as the head is moved downward through the last portion of its arc, when the motor has acquired its full effective speed and power, leaving the counter balance springs in a state of tension ready to assist in the quick opening of the press on the next operation thereof. The press is allowed to remain closed with the heated head in contact with the garment or other article to be ironed or pressed for a period determined by the operator, in accordance with the requirements with the work being performed, and the character of the goods or garments operated upon. When it is desired to release the press and open it, the operator simply raises the guard to its original position, thereby shifting the locking bar rearwardly and raising the switch arm advancing frame. The switch arm having been left at the closing movement of the press, in the position indicated in Fig. 2, the forward forked arm, 68, being in engagement with the stud on the switch arm, the upward movement of the advancing frame will shift the switch arm from the forward dead segment to the upper live segment of the switch, thus starting the motor, which instantly begins to operate the crank and raise the head. The counter balance springs, 94, if employed, tend to assist the motor in lifting the head, and as there is no resistance to its upward movement, except the weight of the head, the motor quickly attains its speed and power, and quickly raises the head through its full arc to its highest position, where it is locked by the locking of the crank, by means of the arresting shoulder, 43, and locking member, 45, at the forward end of the locking bar. The garment or other article is then removed from the buck, and another garment or article, or any portion of the same garment or article made ready on the buck for the next pressing operation. During this upward movement of the head, the driving plate, 56, on the crank shaft will overtake the switch arm and carry it across the upper live segment of the switch to the dead segment at the rear side of the switch, thus shutting off the power, and the stud, 73, on the switch arm will push the advancing arm, 68, to the rear and place itself within the forked portion of the advancing arm, ready for the next operation, as shown in Fig. 7.

The form of advancing mechanism for the switch arm herein shown is such that each half revolution of the crank shaft must be completed so as to bring the shaft into locking position before the next operation can be accomplished. For example, if the crank was not revolved through 180°, the stud, 73, on the switch arm would be left in engagement with one of the advancing arms, 68, without having entered the forked portion thereof, so that the switch arm could not be advanced for the next half revolution of the crank shaft until the preceding half revolution has been completed, so that the operations of the press must take place sequentially, as previously described.

Figure 10:
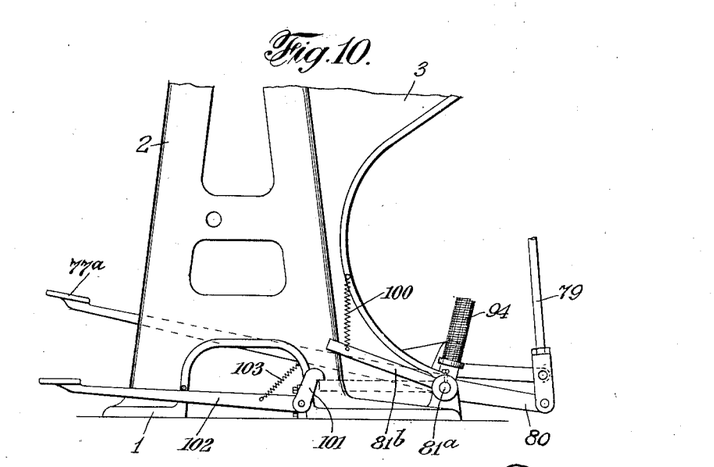
Fig. 10 is a detail view illustrating a slight modification by which means are provided for locking the guard in operative position and for releasing the guard by means of a foot treadle instead of moving it by hand to its inoperative position.

As before stated it is not essential that the part which is manipulated by the operator should be located on the guard, as the handle, 77, although I find this very convenient. It is only necessary that some part accessible to the operator be manipulated for the purpose of effecting the simultaneous actuation of the shifting lever and power mechanism, and preferably the guard, which could be accomplished in other ways. For example, in Fig. 10, I have illustrated a slight modification of the operator operated mechanism, in which the rock shaft, here designated 81$^a$, is provided with a foot lever, 77$^a$, connected therewith against a retracting spring, 100, for the purpose of effecting the simultaneous movement of the guard to downward position, of the locking bar to forward position, and of the switch arm to operative position, for the purpose of closing the press. In this modification the rock shaft is provided with a locking arm, 81$^b$, which is engaged by a pawl, 101, on a release lever, 102, normally supported by a spring, 103, and adapted to be operated by the foot of the operator, so that the operator can effect the upward movement of the head by depressing the foot lever, 102, thereby releasing the locking arm, 81$^b$, and permitting the spring, 100, to rock the rock shaft, 81$^a$, in the opposite direction, and effect the simultaneous movement of the locking bar, 37, the guard, and the switch arm, to effect the lifting movement of the head. I do not, however, desire to be limited to the specific means by which the operator can manipulate the control mechanisms of the press, as these may be obviously varied somewhat, as convenience may dictate, without departing from the invention.

When the press is used for pressing extremely delicate fabric, or for pressing woolen or other articles, a press cloth may be used between the press head and the garment or article operated upon. This press cloth may be placed over the lower face of and secured to the press head, or it may be laid upon the work and moisture may be applied to the press cloth when desired, in any desired manner.

What I claim and desire to secure by Letters Patent is:—

1. In an ironing and pressing machine, the combination with a stationary pressing member, and a pivotally mounted pressing member, of motor actuated operating means for moving the pivoted pressing member into and out of pressing position, means for locking the pivoted pressing member in both open and closed positions, and operator operated control mechanism for controlling the motor actuated operating means and directly connected to said locking means for releasing the same.

2. In an ironing and pressing machine, the combination with a stationary pressing member and a pivotally mounted pressing member, of a crank shaft and crank, power mechanism for operating said crank shaft, and connections between said crank and the pivoted pressing member including a cross head, a part movable therein in opposite directions and engaging said crank, and springs interposed between said movable part and the cross head and located on opposite sides of said movable part, and means for arresting and locking the crank shaft.

3. In an ironing and pressing machine, the combination with a stationary member and a pivotally mounted pressing member, of a crank shaft and crank, connections between said crank and the pivoted pressing member for moving it into and out of pressing position, power mechanism for driving said crank shaft and crank, and means for arresting the crank shaft and locking it in its arrested position.

4. In an ironing and pressing machine, the combination with a stationary pressing member and a pivotally mounted pressing member, of a crank shaft and crank, connections between said crank and the pivoted pressing member for moving it into and out of pressing position, power mechanism for driving said crank shaft and crank, means movable into and out of operative position for locking the crank shaft in two positions at separated points in its cycle including duplicate arresting and locking mechanisms, and operator operated means for controlling said power mechanism and for shifting said locking means to release the crank shaft from one of the locking mechanisms and bringing the other locking mechanism into operative position.

5. In an ironing and pressing machine, the combination with a stationary pressing member and a pivotally mounted pressing member, of motor actuated operating means for moving the pivoted pressing member into and out of pressing position, a motor, means for arresting the said operating means when the pivoted pressing member is in open and closed position, a switch for controlling the motor, and operator operated means connected with said switch and with said arresting means for disengaging the same.

6. In an ironing and pressing machine, the combination with a stationary pressing member and a pivotally mounted pressing member of a crank shaft and crank, power mechanism therefor, connections between said crank and the pivoted pressing member for moving it into and out of pressing position, a longitudinally movable locking bar, a pair of crank arresting and locking devices for engaging the crank in two positions at separated points in its cycle, and operator operated means for controlling said power mechanism, and shifting the locking bar to move one of said arresting and locking devices into and the other out of operative relation to the crank.

7. In an ironing and pressing machine, the combination with a stationary pressing member and a pivoted pressing member, of motor actuated operating means for swinging said pivoted pressing member into and out of operative position, including a shaft rotatable in one direction, an electric motor, a switch provided with live and dead segments, a switch arm operatively connected with said shaft and adapted to be moved thereby into contact with a dead segment of the switch, said switch arm being movable forwardly independently of said shaft, and operator operated control mechanism for moving said switch arm independently of the shaft into engagement with a live segment of the switch to effect the operation of the motor.

8. In an ironing and pressing machine, the combination with a stationary pressing member and a pivoted pressing member, of motor actuated operating means for swinging said pivoted pressing member into and out of operative position, including a shaft rotatable in one direction, an electric motor, a switch provided with live and dead segments, a switch arm operatively connected with said shaft and adapted to be moved thereby into contact with a dead segment of the switch, said switch arm being movable forwardly independently of said switch, locking mechanism for the motor actuated operating mechanism, and operator operated mechanism for simultaneously releasing said locking mechanism and moving said switch arm independently of said shaft into engagement with a live segment of the switch.

9. In an ironing and pressing machine, the combination with a stationary pressing member and a movable pressing member, of a crank shaft and crank, operative connections between the crank and the movable pressing member, a reciprocating locking bar, a pair of locking mechanisms carried thereby, including a stop member and a yieldingly mounted locking member for engaging parts connected with the crank, and means for shifting said locking bar to release the crank from one of said arresting and locking mechanisms, and to bring the other into operative position.

10. In an ironing and pressing machine, the combination with a stationary pressing member and a movable pressing member, of a crank shaft and crank, operative connections between the crank and the movable pressing member, a reciprocating locking bar, a pair of locking mechanisms carried thereby, including a stop member and a yieldingly mounted locking member for engaging parts connected with the crank, and means for shifting said locking bar to release the crank from one of said arresting and locking mechanisms, and to bring the other into operative position, said locking bar being capable of movement transversely thereof toward and from the crank shaft, a cushioning spring engaging said locking bar on one face adjacent to one set of arresting and locking devices, and a cushioning spring engaging the opposite face of the locking bar adjacent to the other set of arresting and locking devices.

11. In an ironing and pressing machine, the combination with stationary and movable pressing members, of operating mechanism for moving the movable pressing member into and out of pressing position, a motor for actuating said operating mechanism, a controlling switch for said motor provided with live and dead segments, and a rotary switch arm driven by the said motor actuated operating mechanism but capable of forward movement with respect thereto, switch arm advancing means including a reciprocating frame, advancing arms pivotally and yieldingly connected therewith, and adapted to engage a part of said switch arm, and operator operated means for actuating said reciprocating frame.

12. In an ironing and pressing machine, the combination with stationary and movable pressing members, of operating mechanism for moving the movable pressing member into and out of pressing position, a motor for actuating said operating mechanism, a controlling switch for said motor provided with live and dead segments, and a rotary switch arm driven by the said motor actuated operating mechanism but capable of forward movement with respect thereto, switch arm advancing means including a reciprocating frame, advancing arms pivotally and yieldingly connected therewith, and adapted to engage a part of said switch arm, means for locking the motor actuated operating means when the movable pressing member is in closed and in open position, operator operated means, and connections therefrom to said reciprocating frame, and to said locking means for releasing said locking means.

13. A pressing machine, comprising relatively movable pressing members mounted for relative opening and closing movements, means for producing such relative movement of said members, means for locking the press in both open and closed positions, and a controller for both said means.

14. A pressing machine, comprising pressing members mounted for relative opening and closing movements, means for producing such relative movement of said members, means for locking the press open, means for locking the press closed, and means for actuating both locking means to simultaneously move one to locking and the other to release position.

15. A pressing machine, comprising pressing members mounted for relative opening and closing movements, power actuating means adapted to produce pressure between said members, operator-operated controlling means adapted for rendering said power actuating means effective or ineffective upon said pressing members, and means actuated by said controlling means for locking the press when it reaches open position.

In testimony whereof I affix my signature.

HARRY PIERCE.